(12) United States Patent
Jancic

(10) Patent No.: US 7,812,238 B2
(45) Date of Patent: Oct. 12, 2010

(54) DEVICE FOR MOUTHPIECE EXERCISES FOR A WOODWIND INSTRUMENT

(76) Inventor: Silvin M. Jancic, Offiziersgasse 16, 5612 Villmergen (CH)

(*) Notice: Subject to any disclaimer, the term of this patent is extended or adjusted under 35 U.S.C. 154(b) by 0 days.

(21) Appl. No.: 12/303,460

(22) PCT Filed: May 24, 2007

(86) PCT No.: PCT/CH2007/000264
§ 371 (c)(1),
(2), (4) Date: Dec. 4, 2008

(87) PCT Pub. No.: WO2007/140637
PCT Pub. Date: Dec. 13, 2007

(65) Prior Publication Data
US 2009/0188375 A1   Jul. 30, 2009

(30) Foreign Application Priority Data
Jun. 8, 2006   (CH) .................................... 0928/06

(51) Int. Cl.
*G09B 15/06* (2006.01)

(52) U.S. Cl. .......................................... 84/465; 84/398
(58) Field of Classification Search ................. 84/465, 84/383 R, 387 R, 398–399, 453
See application file for complete search history.

(56) References Cited

U.S. PATENT DOCUMENTS

| 3,191,481 | A | * | 6/1965 | Miller | ....................... 84/380 R |
| 4,378,724 | A | * | 4/1983 | Lamart | ....................... 84/465 |
| 6,085,864 | A |   | 7/2000 | Copeland et al. | |
| 6,401,860 | B1 |  | 6/2002 | Ellington et al. | |

FOREIGN PATENT DOCUMENTS

| BE | 889 500 A1 | 1/1982 |
| DE | 43 04 904 A1 | 8/1993 |
| DE | 197 22 045 A1 | 7/1998 |

* cited by examiner

Primary Examiner—Jianchun Qin

(57) ABSTRACT

A device for mouthpiece exercises for learning to play a woodwind instrument includes a mouthpiece of a woodwind instrument and a damper which can be placed onto the mouthpiece. The damper has a tubular section at its end facing the mouthpiece and can be inserted in a sealing manner into the mouthpiece opening. The damper is configured for sound absorption in the interior.

8 Claims, 3 Drawing Sheets

DEVICE FOR MOUTHPIECE EXERCISES FOR A WOODWIND INSTRUMENT

BACKGROUND OF THE INVENTION

The invention relates to a device for mouthpiece exercises in order to reduce the volume when learning and practicing to play a woodwind instrument, in particular a saxophone or a clarinet.

For the player of such woodwind instruments with a single reed, it is important to constantly train and further develop his embouchure. Up until now, the entire instrument was needed for such exercises, which is cumbersome to a certain extent and associated a relatively high volume which has a very disturbing effect on the environment, in particular in inhabited spaces. New teaching methods that are very successful and recognized in expert circles, prescribe exercises in which the student practices his embouchure with the mouthpiece of the woodwind instrument only, i.e., without the corpus. As a result, a quickly progressing learning success is achieved. However, it is a disadvantage of this method that these exercises are not only associated with a significant volume but also causes, in particular when beginners are involved, acute tones so that these exercises are perceived by other humans as nuisance.

SUMMARY OF THE INVENTION

It is therefore an object of the present invention to provide a device for mouthpiece exercises for learning and practicing to play a woodwind instrument that allows for performing exercises with the mouthpiece of the instrument only at a soft volume.

This object is achieved by a device for mouthpiece exercises for learning and practicing to play a woodwind instrument having a mouthpiece of a woodwind instrument, and damper that can be plugged onto the mouthpiece, wherein the damper has in the interior an assembly for sound absorption.

It is the basic idea of this solution to plug a damper onto the mouthpiece of the woodwind instrument that softens the tones generated during practice and allows for playing at a volume that is pleasant to the environment.

BRIEF DESCRIPTION OF THE DRAWING

Further advantages of the invention result from the dependent patent claims and from the description below, in which exemplary embodiments of the invention are explained in more detail with reference to the drawings.

It is Shown in.

DETAILED DESCRIPTION OF PREFERRED EMBODIMENTS

In the Figures, same reference numbers are used for same elements and first-time explanations apply to all Figures, unless expressly mentioned otherwise.

Figure 1:
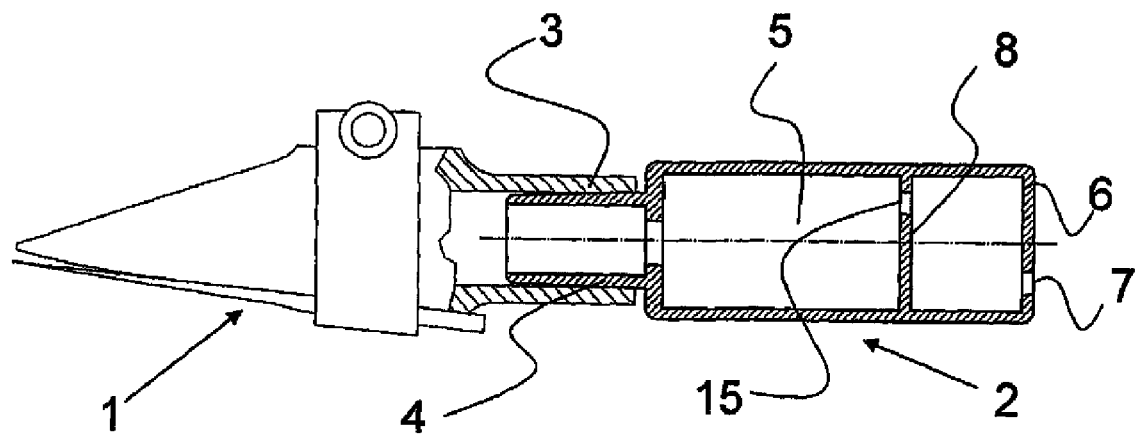
FIG. 1 a cross section of a mouthpiece of a woodwind instrument with a plugged-on damper, schematically illustrated.

FIG. 1 shows a cross section of a first exemplary embodiment of the device in accordance with the invention for mouthpiece exercises for learning and practicing to play a woodwind instrument. The device includes a mouthpiece 1 of a woodwind instrument and a damper 2 that is plugged on the mouthpiece opening 3. In the schematic illustration, details of the mouthpiece 1 of the wind instrument that are known to the person skilled in the art are not shown. The damper 2 has on its end that faces the mouthpiece 1 a tubular section that forms the connecting part 4 to the mouthpiece 1 and whose outer diameter approximately matches the inner diameter of the mouthpiece opening 3 so that the connecting part 4 is pluggable into the mouthpiece opening 3 in a sealing manner. The end 6 that is opposite of the connecting part 4 of the damper 2 has an air and/or sound outlet opening 7. Depending on the embodiment, the interior 5 of the damper 2 is differently designed and serves to absorb the sound. For this purpose, additional means for sound absorption are built into the interior 5 of the damper 2. In the example shown, the hollow space 5 of the cylindrically designed damper 2 is divided by a separating wall 8 into two chambers which are connected with to one another by one or more holes or connection channels 15 in the separating wall. With the device in accordance with the invention, the saxophone or clarinet player can perform his mouthpiece exercises for playing in a normal way of playing, but without the corpus of the instrument, and with softened volume. In the example shown, the size of the damper 2 is approximately in the order of the size of the mouthpiece 1. Therefore, the device can be simply and easily transported and handled and is easy to clean too. However, the damper 2 may be designed such that it is significantly larger, but also smaller, than the mouthpiece 1.

The woodwind instruments have differently sized mouthpieces 1 in the different pitches, i.e., the mouthpiece openings 3 have different diameters. To account for this fact, there are provided differently sized dampers 2 with different diameters of their tubular section 4 that are adapted to the respective instrument intended for them. However, even mouthpieces 1 of the same size, i.e., mouthpieces 1 for woodwind instruments of the same pitch have slightly different mouthpiece openings 3. In order to even out such slight deviations in the diameter of the mouthpiece opening 3, the tubular section 4 is slightly conical on its outer surface and tapers off, starting from the damper 2 in the direction of the mouthpiece 1.

Figure 2:
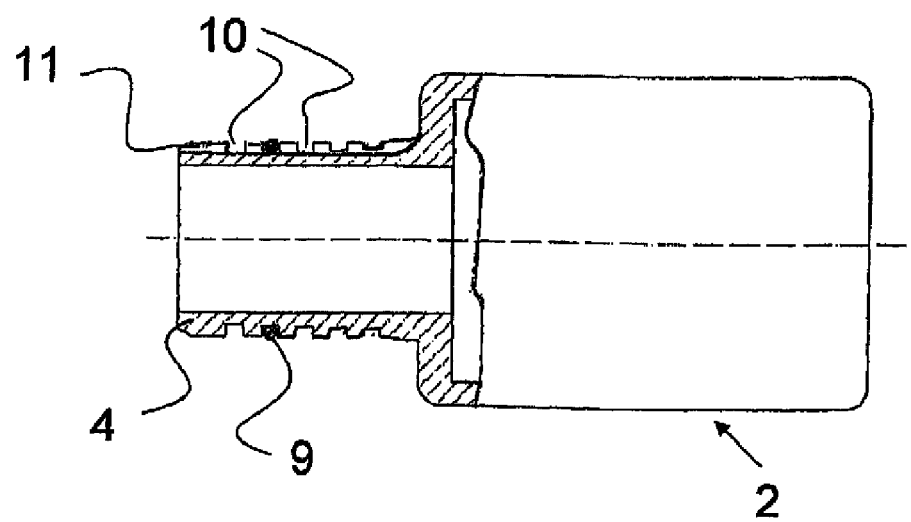
FIG. 2 a partial sectional illustration of a damper.

FIG. 2 shows a partial sectional illustration of a damper 2. In this embodiment, the tubular section has O-ring grooves 10 which are arranged in parallel relationship and into which an O-ring 9 can be inserted. These O-ring grooves have different depths. The depth of incision of the individual grooves 10 decreases from groove to groove, starting from the leading edge of the tubular section 4. Therefore, an O-ring that is inserted into the leading groove has a smaller outer diameter than an O-ring that is inserted into the neighboring groove in the direction of the damper housing because it sits deeper in the groove. With appropriate selection of a groove having an O-ring inserted therein, the damper 2 can be individually and optimally suited to the respective mouthpiece opening 3. A channel 11 extends in axial direction at the surface of the tubular section 4 and facilitates switching and/or moving of an O-ring 9 to another groove 10. By inserting a thin object such as a screw driver into the channel 11 along the longitudinal direction and placing it under the O-ring 9, the O-ring 9 is lifted out of the groove 10 so as to subsequently remove the O-ring 9 and insert it again in a neighboring groove that is deeper or more shallow.

Figure 3:
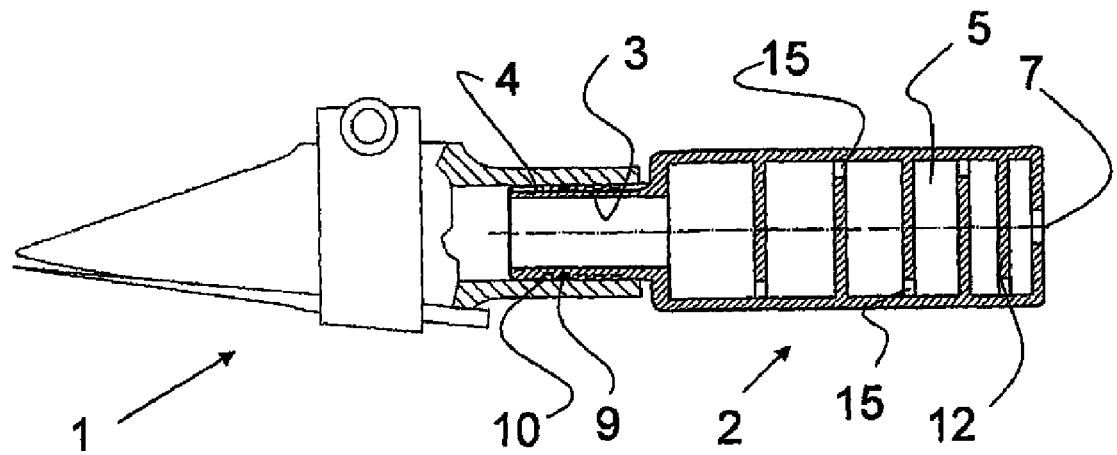
FIG. 3 a device in accordance with the invention having a second embodiment of the damper.

FIG. 3 shows a second embodiment of a device in accordance with the invention. The damper 2 that is plugged into the mouthpiece opening 3 of the mouthpiece 1 has, at its tubular section 4, O-ring grooves 10 in parallel relationship and an O-ring 9 inserted in a groove 10. The O-ring secures the damper 2 in the mouthpiece 1 in a sealing manner. In the interior of the damper 2, two or more damper elements 12 are arranged approximately perpendicular to the longitudinal axis at the inner wall of the damper 2. The damper elements 12 divide the inner space 5 into chambers, wherein each element does not touch the inner wall of the damper 2 at least one location of its perimeter and, thus, forms a through channel 15 between the chambers so that air can flow between the damper element 12 and the inner wall of the damper 2. Advantageously, the damper elements 12 are arranged in the interior 5 of the damper 2 in such a manner that, in the case of neighboring damper elements 12, the free space between the damper element 12 and the inner wall or the through channel 15 is respectively offset to each other. The housing of the damper 2 can have different shapes, such as a cylindrical, spherical or even cuboidal shape. In the case of a cuboidal housing, the damper elements 12 are separating walls, for example, each of which is not connected at all four sides with the inner wall. Coming from the entrance through the connecting part 4, the air stream flows around one damper element 12, i.e., a separating wall, after the other until it is output from the damper 2 again through the outlet opening 7. For the tone generated with the mouthpiece, this arrangement effectuates sound absorption, which leads to a significantly reduced volume of a tone that is generated with the mouthpiece 1.

Figure 4:
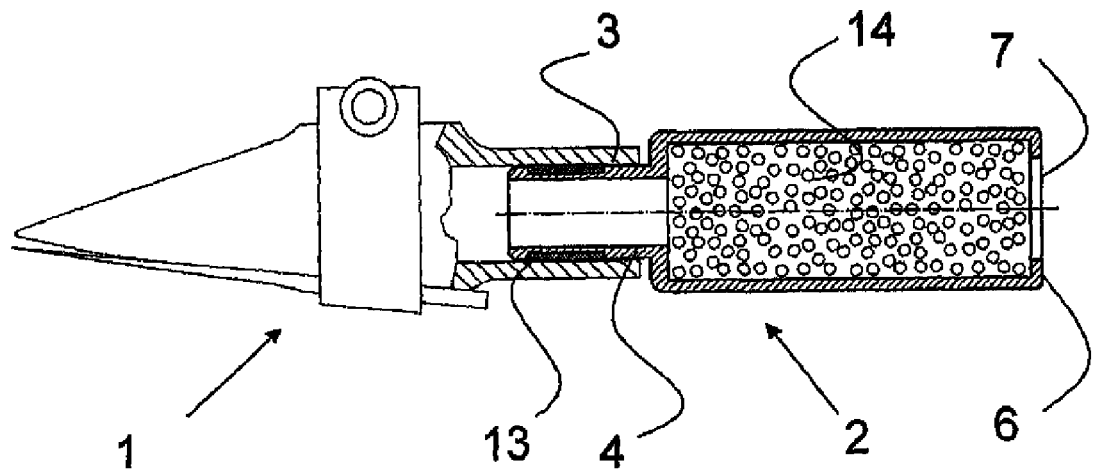
FIG. 4 a device in accordance with the invention having a further embodiment of the damper.

FIG. 4 shows another exemplary embodiment of the device in accordance with the invention. The front area 13 of the slightly conical tubular section 4 is coated with a thin cork layer. Due to the conical shape of the tubular section 4 and the elastic and sealing characteristics of cork, the damper 2 that is plugged into the mouthpiece opening 3 is held in the mouthpiece 1 in a sealing and secured manner. The interior 5 of the damper 2 is filled with a sound-absorbing and air-permeable material 14, e.g., a foam-like or quilting cotton-like material, or porous sintered metals. In practice, the damper 2 has a multi-part structure, which is not shown in the schematic illustrations, so that the filling can be taken out for cleaning or exchanging purposes.

Figure 5:
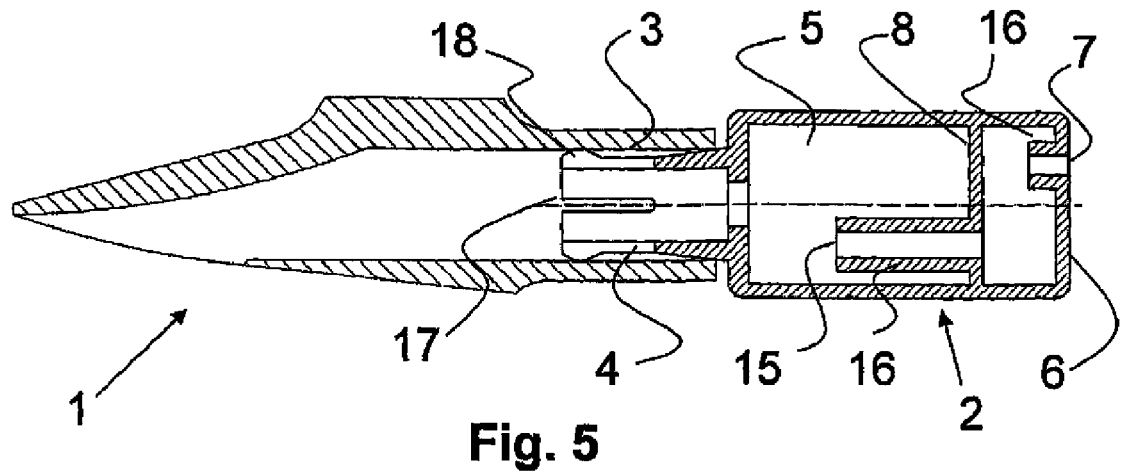
FIGS. 5 and 6 the device in accordance with the invention of FIG. 1 having a tubular connection between the inner chambers.
Figure 6:
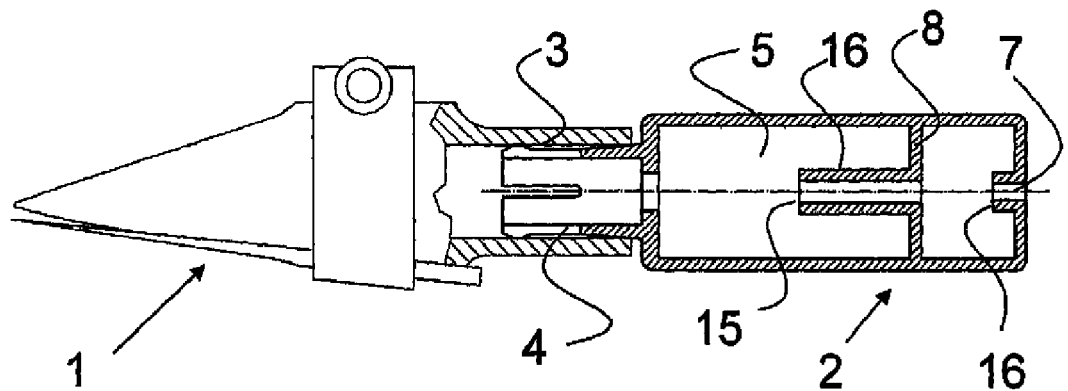

FIGS. 5 and 6 show embodiments of the device in accordance with the invention that are essentially the same as the embodiment of FIG. 1. A separating wall 8 is arranged in the interior 5 of the damper 2 and divides the interior 5 into two chambers. The chambers are connected with each other via the through channel 15. Thus, when playing, air flows from the mouthpiece 1 via the connection 4 into the first chamber and from there via the through channel 15 into the second chamber and is finally output from the damper 2 through the outlet opening 7. The through channel 15 and the outlet opening 7 have tubular sections 16 that protrude into the chambers formed by the separating wall 8 in the interior of the damper 2. The through channel 15 and the outlet opening 7 are arranged in an offset relationship with respect to the longitudinal axis of the damper 2. However, they can also be arranged behind one another in one axis with respect to the longitudinal axis, as shown in FIG. 6. Also, embodiments are conceivable that have multiple separating walls 8 with one or more tubular through channels 15 and that are respectively offset to each other with respect to the longitudinal axis.

Figure 7:
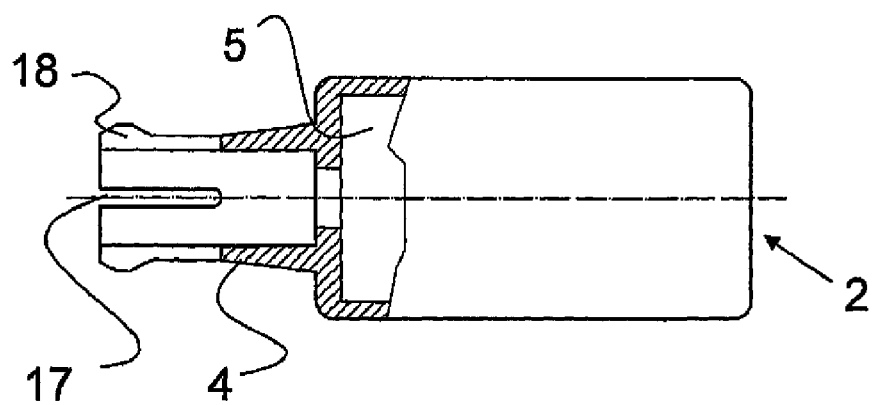
FIG. 7 a partial sectional illustration of a damper having a slotted connecting part.

FIG. 7 shows a schematic partial section illustration of a damper 2. The damper 2 has a conical connecting part 4 with longitudinal slots 17. The outer diameter of the connecting part 4 tapers off, starting from the damper 2 towards the mouth of the connecting part 4. In the area of the mouth, the connecting part 4 has a ring-shaped thickening 18 so that, at the mouth, the outer diameter of the connecting part 4 is approximately as thick as or slightly thicker than at its other end, which is the transition to the damper 2, and approximately matches the inner diameter of the mouthpiece opening 3. Due to the longitudinal slots 17, the front section of the connecting part 4 is elastic and can be slightly squeezed in the radial direction when it is plugged into the mouthpiece opening 3 so that the connecting part 4 can be plugged into the mouthpiece opening 3 in a sealing manner. In the drawing, four slots 17 are shown. More or less slots are conceivable. It is important that the front ends of the connecting part 4 are radially squeezable in an elastically resilient manner so that the ring-shaped thickening 18 and the rear end of the connecting part 4 snugly contact the inner wall of the mouthpiece opening 3. As a result, the damper 2 is held securely in the mouthpiece 1 and can be easily inserted and easily pulled off again of the mouthpiece 1.

The schematic illustrations shown in the Figures are merely exemplary embodiments. In practice, the damper has multiple parts that are assembled in a screwed or plugged manner so that the damper 2 can be disassembled to individual parts for cleaning purposes. To this end, the rear end 6 of the damper 2 can be connected to the damper housing via a threaded connection, for example, and the separating wall 8 with the through channel 15 can be inserted into the damper.

The invention makes it possible to perform mouthpiece exercises with a mouthpiece of a woodwind instrument, such as a clarinet or a saxophone, without corpus, whereby the tones are heard at a pleasant volume. Thus, the device in accordance with the invention is superbly suitable as a learning aid for beginners and as a practice device for advanced saxophone and clarinet players as well. Thus, the embouchure and other musical means of expression can be effectively trained without excessive volume and without noise nuisance.

What is claimed is:

1. A device for a mouthpiece exercise so as to learn to play a woodwind instrument having a single reed, said device comprising:
   a mouthpiece of a woodwind instrument, the mouthpiece having an opening defined by an inner diameter; and
   a damper plugged onto the mouthpiece and having an interior, the damper comprising:
   a tubular section arranged on a mouthpiece-proximal end of the damper and having an outer diameter which approximately equals the inner diameter of the opening of the mouthpiece so that the tubular section is snugly fittable in the opening; and
   a section adjoining the tubular section, the section having a cavity that includes an assembly for sound absorption;
   wherein the assembly includes separating walls to divide the interior of the damper into chambers that are connected with each other via through channels.

2. The device of claim 1, wherein the tubular section has an outer surface of slightly conical configuration to taper from the damper in a direction towards the mouthpiece.

3. The device of claim 1, wherein the tubular section has plural grooves disposed in parallel relationship and having different depths for insertion of O-rings in one-to-one correspondence.

4. The device of claim 1, wherein the tubular section has a front area which is coated with a thin cork layer.

5. The device of claim 1, wherein the tubular section has a damper-distal end to form a mouth and a damper-proximal end, said tubular section formed with longitudinal slots and a ring-shaped thickening in an area of the mouth, wherein the outer diameter of the tubular section is about as thick at the mouth as at the damper-proximal end.

6. The device of claim 1, wherein the through channels are formed by pipe sections.

7. The device of claim 1, wherein the assembly includes a porous, sound-absorbing and air-permeable material which fills the interior of the damper for sound absorption.

8. The device of claim 1, wherein the woodwind instrument is one of a saxophone and clarinet.

\* \* \* \* \*